United States Patent [19]

Sanders

[11] Patent Number: 4,501,176

[45] Date of Patent: Feb. 26, 1985

[54] AUTOMATIC THREADED NUT INSTALLATION AND TORQUING SYSTEM

[75] Inventor: Richard L. Sanders, Marietta, Ga.

[73] Assignee: Lockheed Corporation, Burbank, Calif.

[21] Appl. No.: 508,583

[22] Filed: Jun. 28, 1983

[51] Int. Cl.³ .............................................. B25B 23/14
[52] U.S. Cl. ......................................... 81/470; 81/430
[58] Field of Search ................. 81/469, 470, 467, 430; 173/12

[56] References Cited

U.S. PATENT DOCUMENTS

| 2,887,920 | 5/1959 | Austin | 81/470 |
|---|---|---|---|
| 4,363,573 | 12/1982 | Ginther et al. | 81/430 |
| 4,418,765 | 12/1983 | Mori et al. | 81/470 |

FOREIGN PATENT DOCUMENTS

48206  6/1982  Fed. Rep. of Germany ........ 81/430

Primary Examiner—James L. Jones, Jr.
Attorney, Agent, or Firm—John J. Sullivan

[57] ABSTRACT

There is disclosed and shown an automatic nut installation and torquing system (10) connected with an automatic fastener installation machine (11) whereby a threaded nut (21) is automatically conveyed in proper orientation from a supply source to a final installed position on a threaded fastener (34); the installed nut (21) being at a selectively predetermined final torque value that is selectively variably and controllable without regard to the torque output of the torque motor (48) so long as the desired installed torque value of the nut (21) does not exceed the maximum torque deliverable by the torque motor (48). The variability and controllability of installed torque is accomplishable without any recalibration or readjustment of torque motor (48) to change its torque output.

6 Claims, 9 Drawing Figures

AUTOMATIC THREADED NUT INSTALLATION AND TORQUING SYSTEM

TECHNICAL FIELD

This invention pertains to a system for automatically installing a threaded nut on a threaded fastener, and more particularly a system of interchangeable components for utilization with an automatic fastener installation machine for handling and transporting various sized and configured threaded nuts from a supply source to an installed location on the fastener at a preselected, variable, and precisely controllable torque value.

BACKGROUND ART

Machines are known in the prior art to provide for the automatic installation of fasteners in workpieces such as the insertion of a rivet into a hole with subsequent upset of the rivet tail, as well as the insertion of a threaded fastener into a hole with subsequent supply, installation application and torquing of a threaded nut to the threaded fastener. In the case of installation of threaded nuts, the prior art machines have heretofore experienced a number of troublesome areas of operation that result in frequent shutdown for repair or servicing due to inherent limitations in certain mechanical systems and reduced reliability in other areas of nut handling from the supply source to its installation. For example, the use of plastic tubing in the nut supply path produces inherent limitations in the length and movements of plastic tubing due to their propensity of bending or kinking under certain conditions whereby the effective cross-sectional area is so reduced that nut passage is retarded until geometry of the tubing is realigned.

Another typical example of difficulties that can be encountered in some of the prior art machines is the final nut torquing arrangements of gear trains which lack some degrees of stability and accuracy due to inherent inability to attain variation in final torque values without adjustment or recalibration of the gear train mechanical system or the torque motor.

DISCLOSURE OF THE INVENTION

This invention provides a threaded nut delivery and installation system for utilization with an automatic fastener installation machine whereby the system meets to objects of providing a positive action and stable supply path for the nut from a supply source to a stable and reliable transport mechanism for delivery to a sequential nut pick-up point. From this pick-up point, a positive action transfer means delivers each sequential nut to a catching pin and drive socket for movement into threaded engagement installation on an already installed threaded fastener. The drive system of the nut installing socket is of a chain type with a selective final torquing value of the nut when fully seated by a fluid powered control system interconnected with the socket drive system.

In addition, other objects and advantages are presented in that some of the various components comprising this invention are easily and expeditiously exchangeable with other sized components to enable installation of different sizes or types of nuts.

BEST MODE OF CARRYING OUT THE INVENTION

Figure 1:
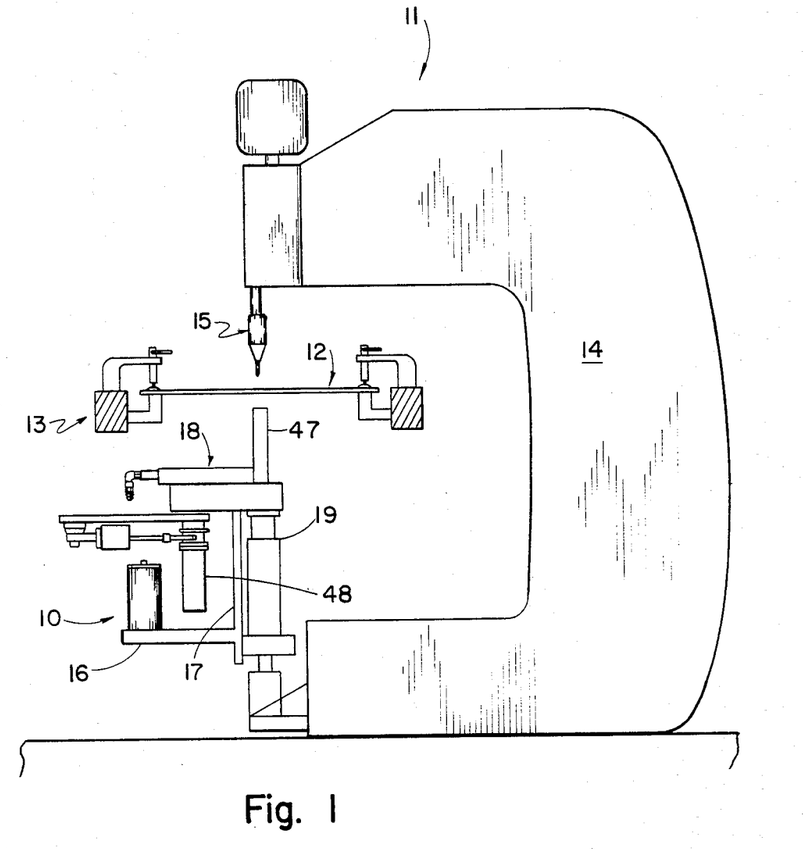
FIG. 1 is a general view showing the relationship of components of one embodiment of this invention when they are mounted to an automatic fastener installation machine.

Referring to FIG. 1, the overall nut installation and torquing system of this invention is represented by the numeral 10 in its location relative to a typical automatic fastener installation machine 11 and a workpiece number 12 held in an appropriate workpiece holding means 13. The machine 11 comprises a C-type form 14 with an appropriate fastener gripping and installation means 15 located above workpiece 12 while the system 10 of this invention is located on the lower portion of machine 11 and below workpiece 12. The relationship between machine 11 and workpiece holding means 13 is such that there is relative horizontal movement therebetween so that upon insertion of one fastener, a relative relocation or realignment between machine 11 and workpiece member 12 can be accomplished for installation of a subsequent fastener. Likewise, once such horizontal rearrangement is accomplished, vertical movements of nut installation system 10 and fastener installation means 15 are conventionally provided for whereby workpiece 12 is appropriately clamped or held securely during installation of a fastener and nut.

It is to be understood that the above arrangement of machine 11 and workpiece items form no part of this invention, but are merely recited to show the general description for functional background of the nut installation and torquing system 10 of this invention.

The four general portions that comprise system 10, each of which will be explained in detail hereinafter, are: a nut source and delivery means 16; a nut feed tube means 17; a nut transfer means 18 to move a nut from the feed tube means 17 to an installation mechanism; and a nut installation and torquing means 19.

Figure 2:
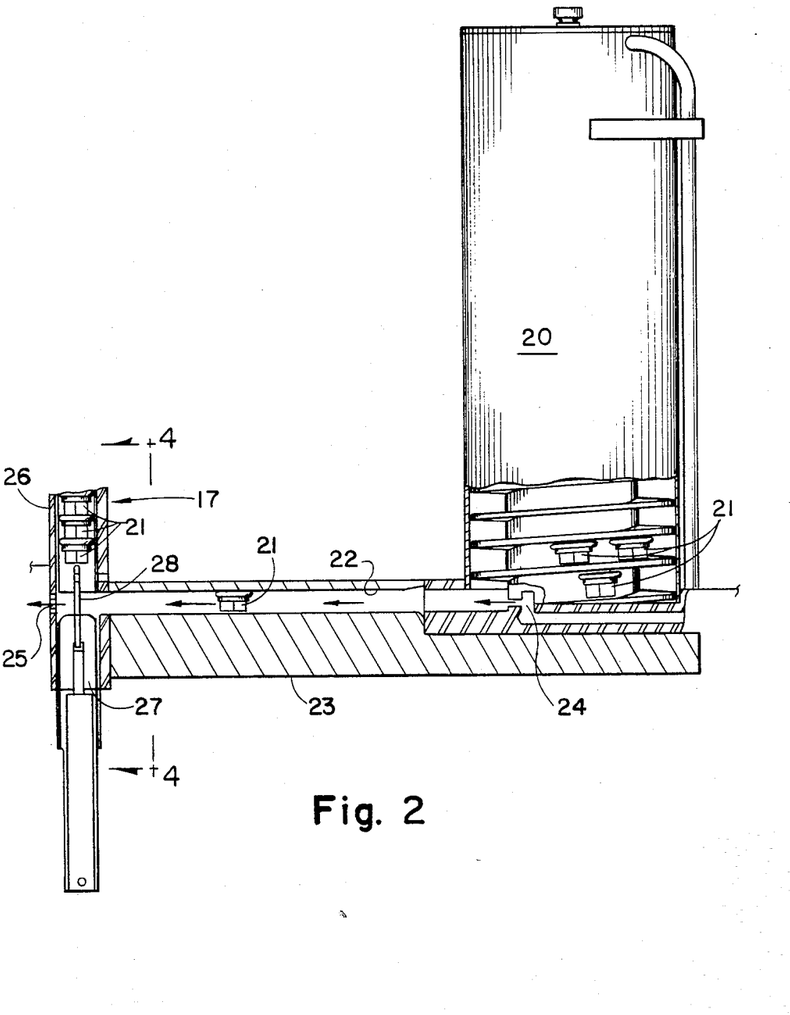
FIG. 2 is a partial cross-section of a portion of one embodiment of this invention whereby the threaded nuts to be installed are automatically moved from a supply source to an intermediate transfer mechanism to feed a nut toward its installation position.
Figure 4:
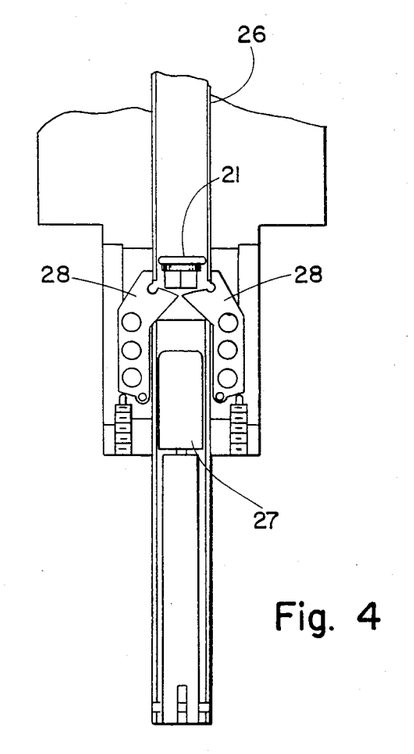
FIG. 4 is a view taken along line 4—4 of FIG. 2.

Referring now to FIGS. 2 and 4, the overall nut source and delivery means 16 includes an appropriate transporting means 20 whereby nuts 21 are received in a proper, predetermined orientation for insertion into a slot 22 located in a lateral transfer plate 23. The cross-sectional configuration of the slot 22 is preferably rectangular and sized slightly larger than the cross-sectional area of the nut 21 being installed, whether the nut 21 be of a configuration having a bearing or seating flange larger than the side surfaces as shown in the embodiment of the invention depicted, or of a more standard configuration where the side surfaces of the nut are substantially constant throughout its height.

An air jet is directed into slot or passage 22 through an opening 24 to move the nuts 21 aligned in slot 22 to a position preparatory to being mechanically inserted into the nut feed tube means 17; the air pressure in slot 22 venting to the atmosphere through an opening 25 in the outer side wall of the main tubular section 26 of nut feed tube means 17.

At the end of slot or passage 22 is a reciprocating piston 27 connected to a fluid actuator (not shown); the piston 27 serving to lift the endmost nut 21 in slot 22 into the vertical tubular section 26 above the spring loaded ratchets 28 (as best seen in FIG. 4) that serve to retain the stack of nuts 21 in tube 26 after piston 27 is retracted below slot or passage 22.

Figure 3:
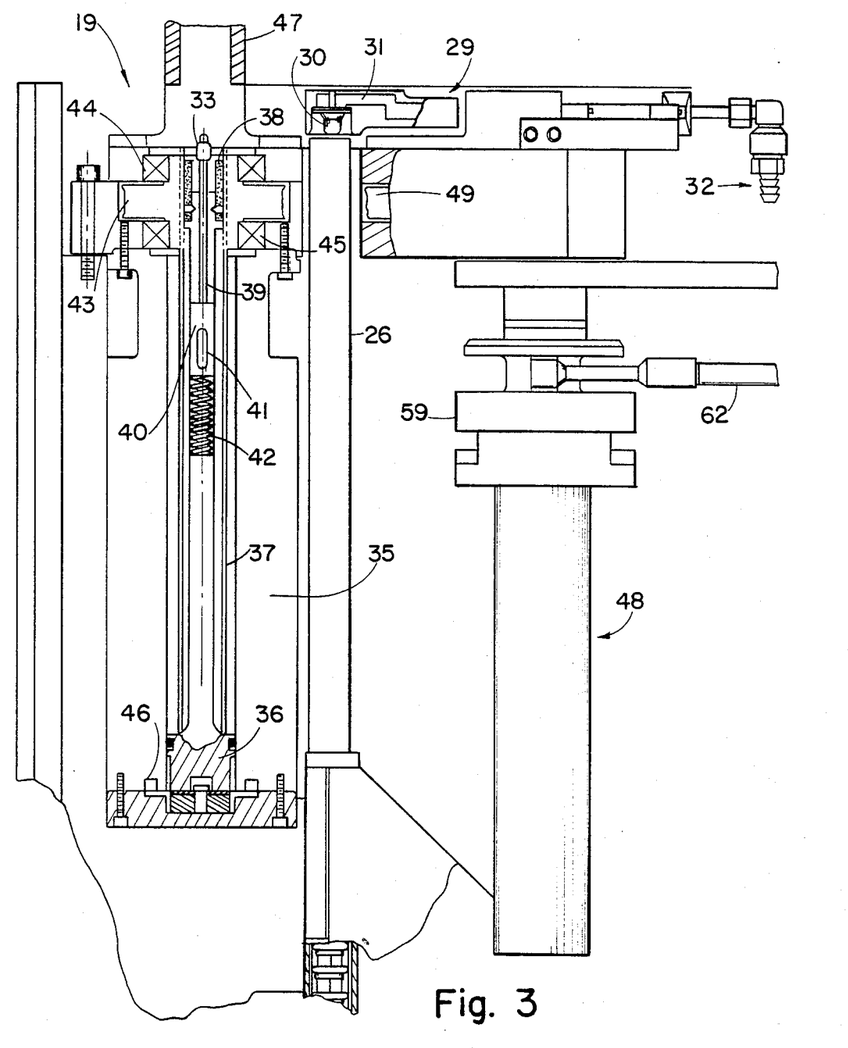
FIG. 3 is a partial cross-section of another portion of one embodiment of this invention showing the passage of a nut to be installed from the intermediate transfer mechanism to the nut installation and torquing mechanism.
Figure 5:
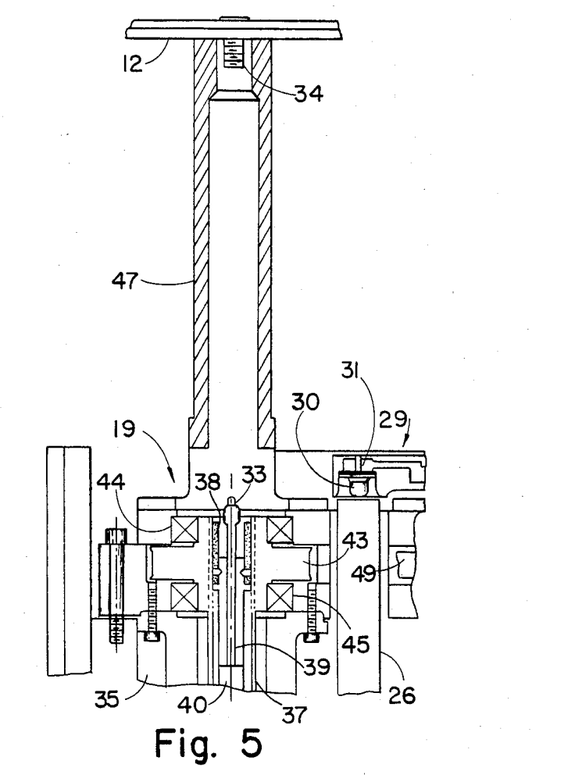
FIG. 5 is a partial cross-section of the portion of one embodiment of this invention showing the passage of a nut to be installed from its location within the installation and torquing mechanism to the actual point of engagement with an installed threaded fastener.

Referring now to FIGS. 3 and 5, at the upper end of tube 26 is the nut transfer means 18 including a nut translating mechanism 29 having a grabber stud 30 adapted to receive the uppermost nut 21 in the tube 26 and retain it by the presence of a vacuum in passage 31 resulting from the other end of passage 31 being connected to a vacuum source at connector 32 of FIG. 3.

The mechanism 29 reciprocates laterally between the position shown in FIGS. 3 and 5 where a nut 21 is received on the grabber stud 30 and the position whereby the nut 21 held on stud 30 is located over a nut catching pin 33 that is included in the nut installation and torquing means 19; the nut 21 being deposited onto pin 33 upon the venting or release of the vacuum holding the nut 21 on stud 30.

In addition to the nut catching pin 33, the nut installation and torquing mechanism 19 further comprises a means to elevate the nut 21 on pin 33 to engage the threaded fastener 34 as seen in FIG. 5; means to apply installation torque to the nut 21 for engagement with fastener 34; and a means to control the final torque value to the nut 21 once it is engaged with the fastener 34 for the final clamping or seating on workpiece 12.

The elevating means comprises a fluid actuating cylinder 35 containing a piston 36 having an externally splined shaft 37 whose end opposite piston 36 is hollowed with a nut driving socket 38 fixedly mounted therein; the internal surfaces of driving socket 38 configured to correspond with the driving surfaces of the nut 21 to be installed. A shank or rod 39 extends from nut catching pin 33 longitudinally inwardly into the hollowed portion of shaft 37, and through the longitudinal extent of socket 38, for a threaded engagement with a piston member 40. Piston member 40 is slidingly retained within the hollow portion of shaft 37 by a pin (not shown) extending through the side walls of shaft 37 and and elongated slot 41 in piston 40. A spring 42 is located within the hollow portion of 37 in contact with piston 40 to bias piston 40 and the nut catching pin 33 to an upward position as shown in FIGS. 3 and 5, while permitting the nut catching pin 33 to be moved or driven telescopically into the hollow portion of shaft 37 as will be set forth in more detail below in explanation of the operation of the invention.

Proximate the hollow end of shaft 37 is an internally splined sprocket wheel 43 axially retained between a pair of roller thrust bearings 44 and 45; the internal splining of sprocket 43 corresponding to the external of shaft 37 to permit a relative spliding movement of shaft 37 relative to srocket 43 as shaft 37 is extended upward out of cylinder 35 by the introduction of pressurized fluid through passage 46 for reaction on the inner surface of piston 36.

Axially aligned with shaft 37 and its corresponding travel path is a hollow mast member 47 that is longitudinally sized to substantially bridge the distance from where a nut 21 will be deposited on nut catching pin 33 to the point of application of the nut 21 onto the threaded fastener 34 as seen in FIG. 5.

Rotary motion for the installation application torque of a nut 21 onto threaded fastener 34 is accomplished by a rotary torque motor or actuator 48 driving a chain or sprocket belt 49 (partially shown in FIGS. 3 and 5); said chain or belt 49 peripherally engageable about sprocket 43 for rotation thereof by motor 48 as explained more fully hereinafter under operation of the invention.

Figure 6:
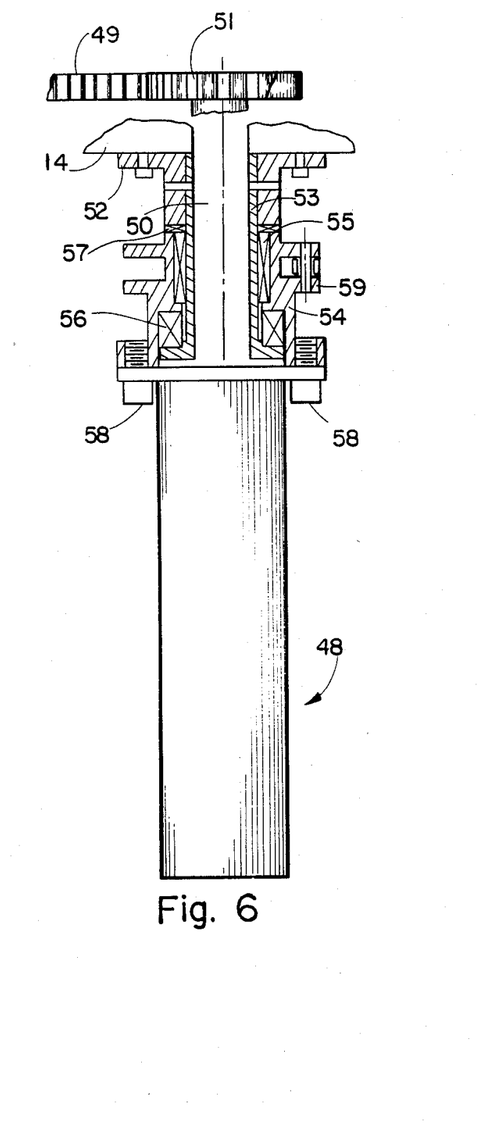
FIG. 6 is a partial cross-section showing one embodiment of the rotational mounting of the nut installation torquing motor to a stationary portion of the overall machine structure.

Referring now to FIGS. 6, 7, 8 and 9, features of the mounting and control means for rotary motor 48 are set forth. Motor 48 is any appropriately sized pneumatic or hydraulic rotary drive or torque motor unit conventionally known in the prior art driving a rotary output shaft 50 having a sprocket 41 proximate the end thereof to drive chain or sprocket belt 49 engaged therearound. The mounting of motor 48 comprises a stationary tubular member 52 securely mounted to the main machine frame 14 with a sleeve type shaft bearing 53 extending through and secured to tubular member 52. The shaft bearing member 53 retains a rotating motor mount member 54 which is free to rotate about shaft bearing 53 by the inclusion of a needle bearing 55 and a ball thrust bearing 56 as shown in FIG. 6; the rotating mount member 54 also being rotatable relative to the stationary tubular member 52 by the presence of an appropriate bronze washer 57 located therebetween. Motor 48 is fixedly mounted to the rotatable mount member 54 by a plurality of bolts 58.

Figure 7:
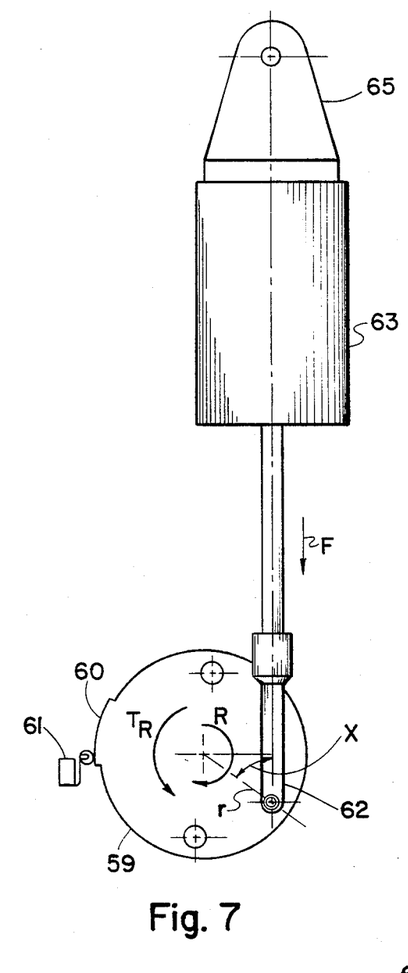
FIG. 7 shows the principal elements incorporated in one embodiment of this invention for controlling the final torque value to an installed fastener nut before the final torque value is attained.
Figure 8:
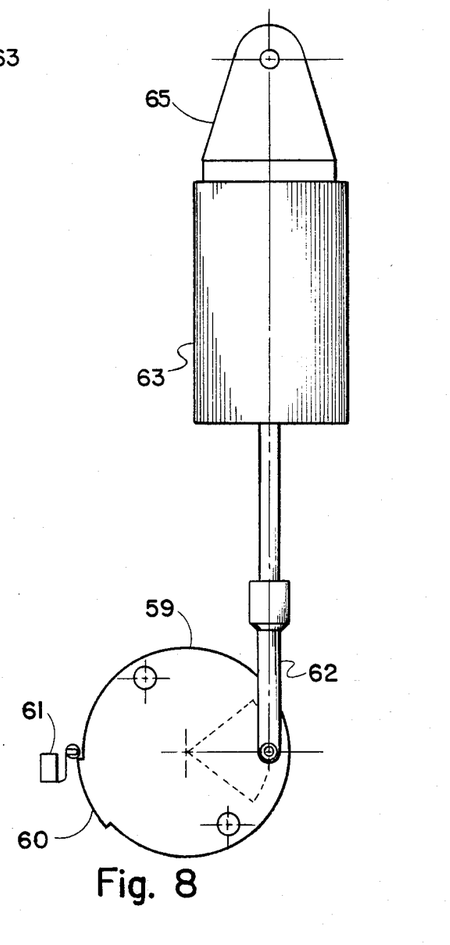
FIG. 8 is similar to FIG. 7 except that it shows the relative positions of the elements at the time of attainment of the final torque value for the fastener nut being installed.
Figure 9:
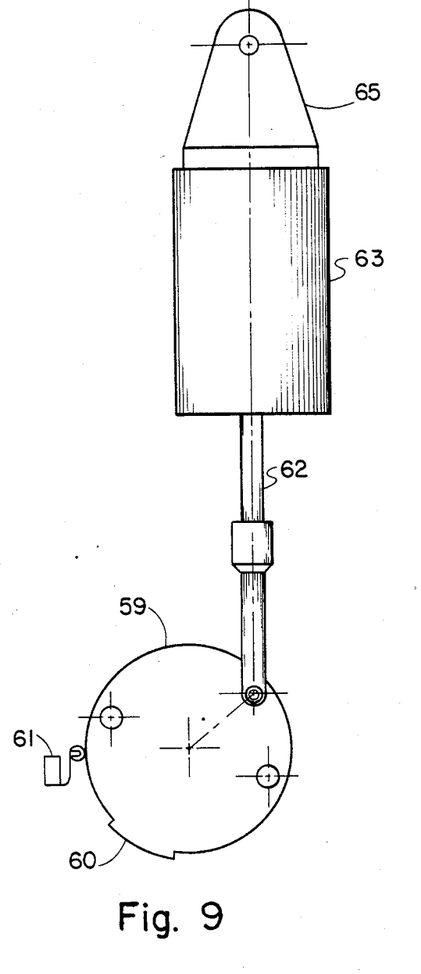
FIG. 9 is similar to FIGS. 7 and 8 except that it shows the relative position of the elements after application of the final torque value.

Intermediate the axial extent of rotating mount member 54 is a radially extending flange portion 59 having a cam segment 60 for operating a micro-switch or other appropriate tripping device 61 as best seen diagrammatically in FIGS. 7, 8 and 9. The end of a piston rod 62 of a pneumatic control cylinder 63 is pivotally connected to a hole or passage 64 in the flange 59 of rotating mount member 54, while the mounting bracket or lug 65 of the cylinder 63 is pivotally mounted to an appropriate stationary location of the machine 11.

INDUSTRIAL APPLICABILITY

Explanation of operation of the system of this invention is made on the basis that once a brief understanding of the operation cycle of a typical automatic fastener installation machine 11 of the prior art is set forth, the passage of one nut 21 from a supply source to its final torqued installation on a threaded fastener 34 will be traced.

The upper head of a typical prior art automatic fastener installation machine 11 will drill a hole in the workpiece member or assembly 12 followed by insertion of the fastener installation means 15 of a threaded fastener 34 into the drilled hole as shown in FIG. 5 with the threaded portion of fastener 34 extending through the workpiece 12 into the open end of mast 47 of the nut installation system 10. It is to be recognized and understood that the length and slenderness or overall diameter of mast 47 is selective to permit operation on fastener installations locations which may be close to projections or obstacles of workpiece assembly 12, while at the same time the mast 47 is to be of sufficient strength to provide the backup thrust for the drilling of the hole and insertion of fastener 34 into workpiece 12.

Referring now to FIGS. 2 and 3, the path of a nut 21 through the installation and torquing system 10 begins by delivery to slot or passage 22 in lateral transfer plate 23 (which passes under torque motor 48 as seen in FIG. 1) after passage from a supply source and an appropriate transporting means 20 with the nut 21 entering the transporting means 20 in a proper orientation as is well known and done by prior art devices.

Once the nut 21 is located in the slot 22, it is moved laterally by positive pressure airflow entering through opening 24 and passing out of opening 25; the movement of nut 21 continuing until it is located over piston 27 at the bottom of tubular section 26 of the nut feed tube means 17. Piston 27 is operated by an appropriate air or pneumatic cylinder (not shown) which is preferably controlled by the lack of a vacuum in passage 31 of the nut translating mechanism 29 that is part of the nut transfer means 18; this lack of vacuum in passage 31 occurring due to the lack of a nut 21 being held on grabber stud 30. Upon the extension of piston 27, the stack of nuts 21 will be elevated in tubular section 26 whereby the uppermost nut in the stack becomes held on grabber stud 30 by the vacuum in passage 31 that becomes reestablished by the presence of a nut thereon, while the lowermost nut in the stack is the one that has just been injected into the stack in tubular section 26 from the end of passage 22 by the action of piston 27. With the detection of a nut 21 on grabber stud 30 by an increased vacuum reading, the system control retracts the piston 27 which lowers the column of nuts now contained in tube 26, with the downward travel of the nut column being stopped by ratchets 28 (FIG. 4) thereby clearing the top of piston 27 to receive the next subsequent nut 21 from passage 22. This immediately preceding sequence is repeated when the grabber stud 30 is clear and in position to receive the next nut 21.

Referring now to FIGS. 3 and 5, operation of the nut transfer means 18 takes place by the translating mechanism 29 moving laterally to where the nut 21, held on grabber 30 by vacuum, becomes located over the nut catching pin 33 of the nut installation and torquing means 19, and upon the venting of the vacuum, nut 21 drops from the grabber stud 30 onto the pin 33. The nut translating means 29 retracts to where it receives another nut 21 from the stack in tube 27 as explained above, and will remain in its retracted and armed position until the installation and torquing of the preceding nut 21 placed on catcher pin 33 is completed and the nut installation and torquing means 19 is in position to receive another nut 21.

The nut 21 mounted on catcher pin 33 is now aligned with the nut driving socket 38, but held slightly above it by catcher pin 33. Rotary or torquing operation of nut driving socket 38 is accomplished by rotary motor 48 driving chain belt 49 which in turn rotates internally splined sprocket 43 causing the externally splined shaft 37 to which socket 38 is connected to rotate. Compressed air supplied to the undersurface of piston 36 is viewed in FIG. 3 raises the end of externally splined shaft 37 containing the nut 21 on catcher pin 33 through the passage in mast 47 into contact with fastener 34 (See FIG. 5).

When the nut 21 engages the fastener 34, the catcher pin 33 telescopes inwardly relative to the externally splined shaft 37 by the compression of spring 42 as a result of physical contact between the tip of catcher pin 33 and the bottom of fastener 34 thereby permitting engagement of drive socket 38 with nut 21 and the consequent application of torque to nut 21. As nut 21 is run onto fastener 34, catcher pin 33 continues to telescope through drive socket 38, thus allowing nut 21 to become fully installed.

Once nut 21 is engaged with the threads of fastener 34, the torque value remains below the maximum torque value or level that can be applied by motor 48. When the clamping action of fastener 34 begins by the nut 21 becoming snug against its bearing surface, the nut 21 will continue to rotate but the torque required to rotate nut 21 rises rapidly to the final value deliverable by motor 48.

To provide selectivity and control of a desired final torque output value by rotary output shaft 50 over a wide or variable operating range without necessitating manual adjustment of torque motor 48 or physical substitution thereof, an automatically controllable torque control system is achieved through the use of pneumatic control cylinder 63 whose piston rod 62 is pivotally connected to the rotary member 54 that motor 48 is connected to as illustrated in FIGS. 3, 6, 7, 8 and 9.

The starting position of the elements and mechanics involved prior to the application of installation torque to a nut 21 onto a fastener 34 by the rotational drive of output shaft 50 of motor 48 is shown in FIG. 7. The piston rod 62 of pneumatic control cylinder or motor 63 is extended to place the rotating motor mount member 54 in the position shown in FIG. 7 by the pivotal connection of piston rod 62 to flange portion 59. When the torquing starts, the direction of rotation of the output shaft 50 is in clockwise direction identified by the arcuate arrow R, while the reaction torque on the motor 48 and rotating motor mount member 54 is in the opposite, or counterclockwise direction as depicted by the arcuate arrow $T_R$. This reaction torque $T_R$ is prevented from rotating motor 48 and the motor mount member 54 by the force F supplied by cylinder 63 through rod 62; which force F is selectively predetermined and controllable by the amount of pressure established in cylinder 63.

The clockwise torque supplied by cylinder 63 in this arrangement is equal to (F) (r) (sin X), with (F) and (r) being fixed once the preselected pressure in cylinder 63 is established for the desired effective (F), while the angle X is variable as will be seen. Thusly, the maximum torque available is (F), (r) (sin 90°), or (F) (r) (1).

This system is appropriately designed and dimensioned so that the torque supplied through cylinder 63 when X=90° is within the torque output range of motor 48. In other words, the final torque desired ($T_D$) for the installation of a nut 21 on fastener 34 is equal to (F)(r), and hence the preselected force (f) to be created through cylinder 63 becomes ($T_D$)/(r).

As seen in FIG. 7, the torque supplied by cylinder 63 is less than ($T_D$) since X is less than 90°. In this situation, with a nut 21 engaged with rotating drive socket 38, nothing changes the arrangement of elements shown in FIG. 7 as motor 48 is supplying a low torque value (i.e. a value less than (F) (r) (sin X), and merely rotating nut 21. When the nut 21 becomes snug, the reaction torque $T_R$ rises rapidly, and when $T_R = $(F) (r) (sin X), the motor 48 and rotatable mount 54 begin to rotate in a counterclockwise direction. This rotation of motor 48 and mount 54 continues until angle X=90° as shown in FIG. 8, whereupon control switch 61, which serves to relieve the pressure to motor 48, is tripped by displacement off of cam surface 60. Once pressure to motor 48 is relieved, existing inertia loads or forces in the system are dissipated by the continued rotation of the motor 48 and mount 54 toward the position shown in FIG. 9 thereby bypassing the inertia problems commonly inherent with other prior art torquing systems.

Upon the completion of installation of a nut 21, and the system of this invention prepares to ready for installation of the subsequent nut 21, control cylinder 63 will return the torque control system components to the start position of FIG. 7.

Through the application of conventional design principles, the system 10 of this invention can be converted from the installation of one size or configuration of nut to another merely by the substitution by the readily replacement of different sized or configured members comprised of the lateral transfer plate 23, tubular section 27, grabber stud 30, catching pin 33 and nut driving socket 38 as necessary. Furthermore, such conversion or change can be made without regard to having to change, or readjust torque motor 48 as any difference desired in the final installed torque value of either the same or different sized or configured nuts can be selectively attained by the pressure in control cylinder 63 and the force (F) supplied thereby so long as the final torque value desired is equal to or less than that deliverable by torque motor 48.

While the particular embodiments of the invention have been illustrated and described, it will be obvious to those skilled in the art that various changes and modifications may be made without departing from the invention, and it is intended to cover all such modifications and equivalents that fall within the true spirit and scope of this invention.

I claim:

1. An automatic nut installation and torquing system adapted to install a nut on a threaded fastener shank inserted through an opening in a workpiece with the fastener located at a nut installation position, said system comprising:

a first passage means for transferring in a substantially horizontal direction a plurality of nuts in seriatim order and predetermined orientation from a supply source to a first nut location;

a substantially vertical and rigid tube member having an upper and lower end, both of which ends are open, said tube member adapted and sized to contain a seriatim stack of a plurality of nuts in the same individual orientation of said nuts as in said first passage means;

a first means for transferring an individual nut from said first nut location into the tube member as the lowermost nut in said stack thereof, said nuts individually progressing in seriatim order upwardly in said stack to a second nut location as the uppermost nut in said stack;

a nut application and torquing means including a vertically oriented, externally splined shaft extending from a pneumatic controlled actuator piston, said externally splined shaft engagingly extending through an internally splined drive means adapted to be rotationally driven about a fixed plane whereby when said internally splined drive means is rotated, said externally splined shaft is also rotated;

said externally splined shaft further including proximate the end of the shaft opposite the piston a hollowed nut drive socket affixed to the shaft and adapted to rotate with said shaft when said shaft is rotated by said internally splined drive means, and a nut catching pin means telescopically interconnected to said shaft and through said nut drive socket, said nut catching pin means adapted to retain a nut through gravitational forces when placed thereon and free of the nut drive socket until said pin means is moved telescopically into said nut drive socket by the end of the threaded fastener shank the nut is to be engaged with whereby said nut drive socket drivingly engages the nut;

second means for transferring a nut from the second nut location at the top of said stack to a location on said nut catching pin means;

a torque motor means;

and a torque transfer means interconnecting said torque motor means and said internally splined drive means whereby torque generated by said motor means is delivered to a nut engaging a threaded fastener through rotation of said nut drive socket.

2. An automatic nut installation and torquing system as claimed in claim 1 where said first passage means transferring said nuts from said supply to said first nut location includes a positive pressure airflow therethrough in the same direction of nut passage.

3. An automatic nut installation and torquing system as claimed in claim 1 wherein said first means for transferring said nut from said first nut location into said tube member comprises a vertically reciprocating piston located in the lower end of said tube member wherein when said piston is in its lowermost position, a nut may be located on the head thereof and thereby occupy said first nut location, and when said piston is in its uppermost, extended position, the entire stack of nuts in said tube member are elevated whereby the uppermost nut in said stack and occupying said second nut location may physically contact said second means for nut transfer from said second nut location;

and, spring biased toggle means adapted to prevent the downward travel of the stack of nuts located in said tube member from any interference with said first nut location as the piston is returned toward its lowermost position and clear of said first nut position.

4. An automatic nut installation and torquing system as claimed in claim 1 wherein said second means for transferring a nut from said second nut location to said nut catching pin means includes a nut retention means horizontally reciprocable between a first and second position, said nut retention means adapted to receive, when in its first position, a nut from said second nut location and retain it physically by a vacuum applied to said nut retention means whereupon said nut retention means translates to its second position and upon the release of vacuum the nut is released from the nut retention means to drop onto said nut catching pin means.

5. An automatic nut installation and torquing system as claimed in claim 1 wherein said torque motor means is adapted to be rotationally mounted to a fixed structural member;

said torque motor means including an external flange portion that is rotatable relative to the fixed structural member to produce a torque reaction in a direction opposite to the torque applied by the output shaft of the torque motor means when the torque motor means is operating;

a torque control means comprising a pneumatic control cylinder having a piston rod pivotally connected to said flange portion of said torque motor means at a location radially spaced from the rotational axis of said torque motor means, said pneumatic control cylinder producing a selective force through its piston rod to prevent said torque motor means from rotating as a result of said reaction torque until said reaction torque rises to a value greater than that exerted by said pneumatic control cylinder and the torque motor means begins to rotate due to said reaction torque;

and a cutoff control means adapted to cooperate with the flange portion of the torque motor means whereby when said torque motor means attains a predetermined amount of rotation due to said reaction torque, supply of operating power to said torque motor means is ceased.

6. A control arrangement for limiting the output torque delivered by a torquing motor output shaft comprising the combination of:

a torque motor means including an outer casing means having an arcuate flange extending radially around at least a portion thereof, and a torque output shaft extending axially from within said outer casing means, said output shaft adapted to rotate in one direction relative to said outer casing means when said torque motor means is operated;

said outer casing means of the torque motor means adapted to be rotationally mounted to a fixed structural member when installed whereby said outer casing means is rotatable relative to the fixed structural member in a direction opposite the direction of rotation of said output shaft when said torque motor means is operating, said opposite rotation of said outer casing means resulting from reaction torque of the output shaft rotation;

a torque control means comprising a pneumatic control cylinder having a piston rod pivotally connected to said flange portion of said outer casing means at a location radially spaced from the rotational axis of said outer casing means, said pneumatic control cylinder producing a selective force through its piston rod to prevent said outer casing means from rotating as a result of said reaction torque until said reaction torque rises to a value greater than that exerted by said pneumatic control cylinder and the outer casing means begins to rotate due to said reaction torque;

and a cutoff control means adapted to cooperate with the flange portion of the outer casing means whereby when said outer casing means attains a predetermined amount of rotation due to said reaction torque, supply of operating power to said torque motor means is ceased.

* * * * *